July 10, 1962 W. J. FAULKNER ET AL 3,043,533
REEL MOUNTING MEANS
Original Filed May 16, 1958
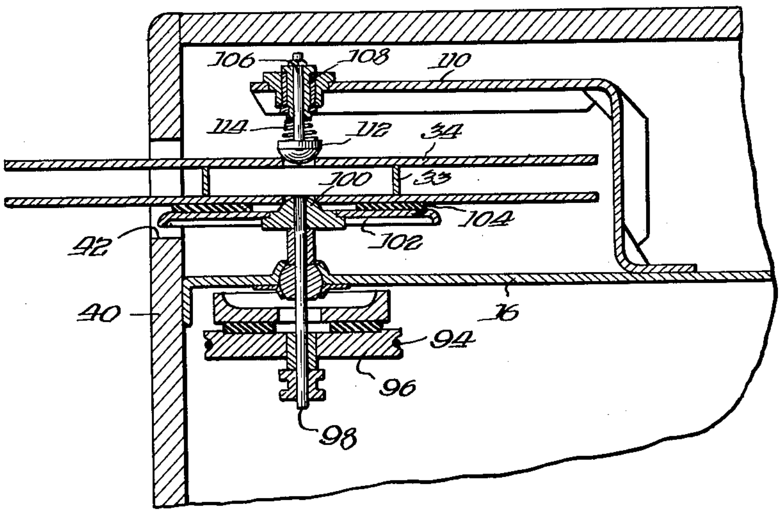
Inventors.
Willard J. Faulkner &
Robert B. Rhoades.
By Brown, Jackson, Boettcher & Dienner
Attys.

United States Patent Office 3,043,533

Patented July 10, 1962

3,043,533

REEL MOUNTING MEANS

Willard J. Faulkner and Robert B. Rhoades, Coloma, Mich., assignors to V-M Corporation, Benton Harbor, Mich., a corporation of Michigan Original application May 16, 1958, Ser. No. 735,778. Divided and this application Aug. 28, 1959, Ser. No. 841,429

4 Claims. (Cl. 242—68.4)

The present invention is concerned with the feeding or loading of reel or spool carried mediums, such as magnetic recording tape or wire and camera or motion picture film, onto their reels and into or through the apparatus, such as recorder-reproducers, cameras and projectors, with which the medium is intended for cooperation. More particularly, the invention relates to a reel mounting means, and to improvements afforded as a consequence thereof in apparatus of the character described.

The present application is a division of our copending application for "Reel Feed Mechanism," Serial No. 735,778, filed May 16, 1958.

Our invention has as an object the provision of means facilitating mounting of a supply reel in apparatus of the character described.

Another object is the provision in apparatus for utilizing tape, photographic film, wire, or like mediums of mounting means for a supply reel carrying such a medium which affords easy and positive reception and positioning of the reel therein.

A further object is the provision of means for mounting a supply reel within an enclosure for apparatus utilizing the reel which allows application and removal of the reel from the exterior of the enclosure without opening thereof or exposure of the apparatus.

Another object is the provision of reel mounting means which securely holds the reel yet requires no manipulation for application or removal of the reel.

Another object of the invention is the provision of reel mounting means adapted for mounting a reel in any desired predetermined plane.

Other objects and advantages of the present invention will become apparent in the following detailed description.

Now, in order to acquaint those skilled in the art with the manner of making and using the reel mounting means of our invention, we shall describe, in connection with the accompanying drawings, one embodiment of the reel mounting means by which the objects of the invention are completely achieved, the following description and the accompanying drawing being directed to an embodiment of an apparatus such as may be employed in the handling of magnetic recording tape, from which example the applicability of our invention to other fields of use will be apparent.

In the drawings:

The single FIGURE of the drawing is a fragmentary vertical sectional view of reel mounting means according to the present invention, within a housing or cabinet for magnetic tape recording apparatus.

The reel mounting mechanism is illustrated as incorporated in the housing or cabinet 40 of a magnetic tape recorder the structural details and operational features of which are not disclosed since they do not form part of the present invention. The cabinet 40 has in one of its side walls a supply reel loading slot 42 which has a length somewhat greater than the diameter of the largest reel to be accommodated by the mounting means, and a width or height greater than the thickness of the reel. Suitably secured in the cabinet 40 is a horizontal supporting plate or mounting deck 16, disclosed at a level somewhat below that of the slot 42. This deck 16 is employed to mount and support the means for mounting a supply reel, such as the reel 34, which has a hollow hub 33 on the axis of which apertures are formed in the hub flanges, as well known in the art.

The reel mounting means, as already mentioned, is located within the cabinet 40, adjacent the slot 42, for mounting and accurate positioning of the supply reel. As shown in the FIGURE, a supply or rewind reel shaft 98 is disposed closely adjacent and parallel to the side of the cabinet 40 in which the slot 42 is formed. The shaft extends through the deck 16 and is rotatably supported thereby, any appropriate bearing means being employed for this purpose. The shaft 98 may be arranged to be rotated for rewinding of the tape or other medium on the reel 34 by any appropriate means, in this case shown as comprising a suitable pulley belt 94 extending about a pulley 96 secured on the lower end of the shaft 98, the belt being driven when desired by suitably controllable means, not shown, to drive the shaft 98 in the reel rewind direction. It will be appreciated that the tape or other medium is unwound from the reel 34 and onto a take-up reel or the like, as well known in the art, by any appropriate means, the belt 94 being inoperative during such unwinding from the reel 34, and the reel 34 being rotated in the tape unwinding direction by the pull on the tape. At its upper end, above the deck 16, the shaft 98 carries an aligning button 100 including a parti-spherical head and a radially extending flange. The button is disposed in horizontal alignment with the slot 42 and is aligned substantially with the vertical center line of the slot. The flange of the button carries a driving disc 102, which may suitably extend into the slot 42 and which is provided with an annular disc 104 of friction material on its upper surface, the upper surface of the friction disc being disposed just below the top of the button's head. Disposed in axially aligned upwardly spaced relation to the shaft 98 is a pin or stub shaft 106 which is mounted for rotation and axial movement in a bearing 108 carried by a supporting bracket 110. This pin or stub shaft is provided at its lower end with an aligning button 112, and a compression spring 114 is confined between said button and said bearing for normally biasing the button 112 toward the button 100, the normal spacing between the aligning buttons being less than the thickness of a standard reel. The supporting bracket 110 includes an elongate horizontal portion of a length greater than the radius of the largest reel to be handled, which portion preferably extends inwardly of the cabinet perpendicular to the side thereof and in alignment with the vertical center line of the slot 42. At its inner end, the bracket includes depending portions which are fixed to the deck 16, thereby to afford a secure mounting for the axially movable button 112.

By virtue of the described structure, the supply reel 34 of recording tape or a like reel-carried medium can be properly located relative to the supply reel drive shaft 98 in driving engagement therewith by the simple expedient of sliding the reel edgewise through the slot 42. As the reel engages the aligned buttons 100 and 112, the sperical surfaces of the buttons act as cams causing the button 112 and its shaft 106 to be moved upwardly to accommodate entry of the reel between the buttons. As the reel is moved inwardly of the cabinet, the axial openings in the flanges thereof are brought into general alignment with the shafts 98 and 106, whereupon the aligning buttons enter into said openings and by virtue of their spherical surfaces center the reel on said shafts. As the button 100 enters into the axial opening in the adjacent flange of the reel 34, the reel is permitted to move downwardly relative thereto to bring the reel into engagement with the friction disc 104, the reel thereafter being resiliently held in driving engagement with the disc and the drive shaft 98 by the button biasing spring 114. As illustrated, the shafts 98 and 106 are located sufficiently close to the side of the cabinet that a reel of the smallest diameter to be handled by the recorder will project outwardly of the cabinet to facilitate loading and unloading of the reel.

It will be apparent that the reel mounting means disclosed affords a very easy, simple, and practically foolproof manner of applying or inserting and of removing the reel, and that the reel is accurately positioned and securely held by the mounting means. The mounting means furthermore allows the insertion and removal of the reel without any necessity for opening the cabinet or for exposing the recording or other apparatus. Also, since the reel is inserted and removed by merely sliding the same through the slot 42 into or out of the mounting mechanism, there is no need for any manipulation of such mechanism, and no parts or elements requiring manipulation are included in the mounting means. No locking or latching means, detent means, or the like are required to hold the reel 34 securely fixed relative to the shaft 98 for rotation therewith, the resilient and frictional gripping action of the mechanism, which is achieved automatically by insertion of the reel into the mechanism, assuring the desired holding of the reel. It may be pointed out that although the invention has been disclosed as embodied in means for mounting a reel in a horizontal plane, the mounting means may just as readily be employed to hold the reel in a plane other than horizontal, as for example in a vertical plane in the case of a movie film projector.

Thus, the objects of the present invention have been shown to be achieved in a highly convenient, economical and practical manner. The apparatus described may be used with equal facility in either the horizontal position illustrated or in a vertical position, and in either position will perform its described functions in a fully practical manner whether the medium employed be tape, movie film, wire, or other reel or spool carried mediums.

Accordingly, while we have described what we regard to be a preferred embodiment of our supply reel mounting means embodying the concept of the present invention, it is to be appreciated that various changes, rearrangements, and modifications may be made in the disclosed construction without departing from the scope of the invention, as defined by the appended claims.

We claim:

1. In a tape recorder or the like having a cabinet, a supporting deck within the cabinet and a reel drive shaft extending through the deck, the improvement comprising a disc of friction material on the drive shaft adjacent the free end thereof, a pin aligned with said shaft adjacent said free end thereof, means mounting said pin for rotation and for axial movement, means biasing said pin toward said shaft, and reel aligning button means on the adjacent ends of said shaft and said pin, the cabinet having a slot therein of a size only slightly larger than an axial section of a reel adjacent said shaft and pin and extending transversely of said shaft and pin in alignment with the space between the adjacent ends thereof to constitute a reel mounting guide, whereby a reel may be mounted on said shaft simply by slipping the same through said slot.

2. Reel mounting means comprising a drive shaft for a reel, a disc of friction material on said shaft adjacent one end thereof for establishing a drive connection of said shaft with said reel, axially movable means held against substantial lateral movement mounted in alignment with said shaft in spaced opposed relation to said one end thereof for retaining the reel on the shaft and in engagement with said disc, means biasing said movable means toward the shaft, reel aligning means on the adjacent ends of the shaft and movable means normally spaced apart a distance less than the axial dimension of the reel engageable with opposite sides of the reel for axial alignment thereof with the shaft, means enclosing said shaft, disc, and movable means having a wall portion disposed closely adjacent said disc, and an opening slightly larger than an axial section of the reel defined in said wall portion for passage of the reel onto and off the disc in mounting and removal thereof.

3. Reel mounting means substantially as defined in claim 2, in which said disc is of substantially smaller diameter than said reel, whereby a portion of the reel in mounted position projects outwardly of said enclosing means through said opening.

4. Reel mounting means comprising a drive shaft for the reel, a pin aligned with said shaft in spaced relation to one end thereof, means mounting at least one of said pin and shaft for substantially rectilinear axial movement, means effecting relative biasing of the pin and shaft toward each other, a disk of friction material on the shaft adjacent said one end thereof, and opposed convex button members on the adjacent ends of the shaft and pin normally spaced apart a distance less than the axial dimension of the reel, the button member on the shaft projecting slightly axially of said disk, whereby radial movement of a reel between the shaft and pin effects relative yielding movement of said button members for disposition of the reel substantially in axial alignment with the shaft and pin urged into frictionally driven engagement with said disk.

References Cited in the file of this patent

UNITED STATES PATENTS

| | | |
|---|---|---|
| 2,066,637 | Marchev | Jan. 5, 1937 |
| 2,537,883 | Ernisse | Jan. 9, 1951 |
| 2,650,035 | Egee | Aug. 25, 1953 |